United States Patent
Kulkarni et al.

(10) Patent No.: US 11,200,634 B2
(45) Date of Patent: Dec. 14, 2021

(54) DYNAMIC WATERMARKING OF VEHICLE CAMERA IMAGES

(71) Applicant: Ford Global Technologies, LLC, Dearborn, MI (US)

(72) Inventors: Amit Kulkarni, San Jose, CA (US); Hafiz Malik, Canton, MI (US); John Moore, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 561 days.

(21) Appl. No.: 15/881,251

(22) Filed: Jan. 26, 2018

(65) Prior Publication Data

US 2019/0236745 A1   Aug. 1, 2019

(51) Int. Cl.
G06T 1/00 (2006.01)
H04L 9/08 (2006.01)
(Continued)

(52) U.S. Cl.
CPC ............ G06T 1/005 (2013.01); G06T 1/0021 (2013.01); H04L 9/0819 (2013.01); H04N 7/183 (2013.01);
(Continued)

(58) Field of Classification Search
None
See application file for complete search history.

(56) References Cited

U.S. PATENT DOCUMENTS

| 6,240,121 B1 * | 5/2001 | Senoh ................. G06T 1/0028 375/130 |
| 6,654,501 B1 * | 11/2003 | Acharya ............... G06T 1/0028 380/269 |

(Continued)

FOREIGN PATENT DOCUMENTS

| CN | 104866735 A | 8/2015 |
| CN | 105306778 A | 2/2016 |
| WO | 201758756 A1 | 4/2017 |

OTHER PUBLICATIONS

Woo-Hyun Ko, B. Satchidanandan and P. R. Kumar, "Theory and implementation of dynamic watermarking for cybersecurity of advanced transportation systems," 2016 IEEE Conference on Communications and Network Security (CNS), Philadelphia, PA, 2016, pp. 416-420.*

(Continued)

Primary Examiner — Jeffrey Nickerson
Assistant Examiner — Vadim Savenkov
(74) Attorney, Agent, or Firm — Frank A. MacKenzie; Bejin Bieneman PLC (57) ABSTRACT

A vehicle computer includes a watermark memory and a watermark processor programmed to execute instructions stored in the watermark memory. The instructions executed by the watermark processor include receiving an image captured by a camera, selecting a set of random pixel locations, generating a random watermark, and embedding the random watermark into the image at the set of random pixel locations. Another vehicle computer includes a vali- (Continued)

dation memory and a validation processor programmed to execute instructions stored in the validation memory. The instructions executed by the validation processor include receiving a watermarked image, determining a random watermark, detecting an embedded watermark in the received watermarked image by selecting a set of random pixels and analyzing the selected set of random pixels for the random watermark, and authenticating the watermarked image as a result of determining that the watermarked image includes the random watermark at the set of random pixel locations.

18 Claims, 2 Drawing Sheets (51) Int. Cl.
H04N 7/18 (2006.01)
G05D 1/02 (2020.01)
(52) U.S. Cl.
CPC ... G05D 1/0246 (2013.01); G05D 2201/0213 (2013.01); G06T 2201/0051 (2013.01); G06T 2201/0053 (2013.01); G06T 2201/0065 (2013.01)

(56) References Cited

U.S. PATENT DOCUMENTS

| 9,118,872 | B1* | 8/2015 | Goodman | G06T 5/40 |
| 2004/0005078 | A1* | 1/2004 | Tillotson | H04N 1/00307 |
| | | | | 382/100 |
| 2004/0032972 | A1* | 2/2004 | Stach | G06T 1/0021 |
| | | | | 382/104 |
| 2004/0071311 | A1 | 4/2004 | Choi et al. | |
| 2005/0144456 | A1* | 6/2005 | Acharya | G06T 1/0028 |
| | | | | 713/176 |
| 2005/0169498 | A1 | 8/2005 | Choi et al. | |
| 2006/0080743 | A1* | 4/2006 | Zhu | G06T 1/0042 |
| | | | | 726/30 |
| 2006/0184531 | A1* | 8/2006 | Russlies | G01C 21/32 |
| 2007/0204163 | A1* | 8/2007 | Andrews | G06F 21/10 |
| | | | | 713/176 |
| 2009/0136081 | A1* | 5/2009 | Mamidwar | H04N 21/6581 |
| | | | | 382/100 |
| 2009/0310817 | A1 | 12/2009 | Park et al. | |
| 2012/0148089 | A1* | 6/2012 | Vashistha | G06T 1/005 |
| | | | | 382/100 |
| 2014/0049653 | A1* | 2/2014 | Leonard | H04N 5/44 |
| | | | | 348/207.1 |
| 2017/0012774 | A1* | 1/2017 | Antoni | H04W 4/70 |
| 2017/0061562 | A1 | 3/2017 | Kim et al. | |
| 2017/0228410 | A1* | 8/2017 | Slusar | G06F 21/6245 |

OTHER PUBLICATIONS

A. T. S. Ho and Xunzhan Zhu, "Traffic image authentication based on pinned sine transform," The IEE International Symposium on Imaging for Crime Detection and Prevention, 2005. ICDP 2005., London, UK, 2005, pp. 45-48.*

S. Maheshwari, R. Gunjan, V. Laxmi and M. S. Gaur, "Robust multi-modal watermarking using visually encrypted watermark," 2012 19th International Conference on Systems, Signals and Image Processing (IWSSIP), Vienna, 2012, pp. 72-75.*

C. Lin and M. Wang, "An Implementation of a Vehicular Digital Video Recorder System," 2010 IEEE/ACM Int'l Conference on Green Computing and Communications & Int'l Conference on Cyber, Physical and Social Computing, Hangzhou, China, 2010, pp. 907-911, doi: 10.1109/GreenCom-CPSCom.2010.78.*

Harjito, Bambang. 2013. Copyright protection of scalar and multi-media sensor network data using digital watermarking. Ph.D. Curtin University, School of Information Systems, Curtin Business School.*

* cited by examiner

DYNAMIC WATERMARKING OF VEHICLE CAMERA IMAGES

BACKGROUND

The Society of Automotive Engineers (SAE) has defined multiple levels of autonomous vehicle operation. At levels 0-2, a human driver monitors or controls the majority of the driving tasks, often with no help from the vehicle. For example, at level 0 ("no automation"), a human driver is responsible for all vehicle operations. At level 1 ("driver assistance"), the vehicle sometimes assists with steering, acceleration, or braking, but the driver is still responsible for the vast majority of the vehicle control. At level 2 ("partial automation"), the vehicle can control steering, acceleration, and braking under certain circumstances without human interaction. At levels 3-5, the vehicle assumes more driving-related tasks. At level 3 ("conditional automation"), the vehicle can handle steering, acceleration, and braking under certain circumstances, as well as monitoring of the driving environment. Level 3 requires the driver to intervene occasionally, however. At level 4 ("high automation"), the vehicle can handle the same tasks as at level 3 but without relying on the driver to intervene in certain driving modes. At level 5 ("full automation"), the vehicle can handle almost all tasks without any driver intervention. Various sensors, such as cameras, lidar sensors, radar sensors, ultrasonic sensors, etc., are used by the vehicle to perform autonomous operations.

DETAILED DESCRIPTION

Autonomous vehicles rely on inputs from various sensors to navigate and make real-time decisions without human intervention. The sensors transmit data representing the surrounding environment to various vehicle control modules. The data is used to help decide the path and actions taken by the autonomous vehicle. This means that the integrity of the communications between the sensors and the receiving modules should be maximized. Otherwise, the receiving module risks acting on spoofed data, which is data injected into the communication channel by an unauthorized source (i.e., a source other than one of the vehicle sensors or other authorized vehicle components).

For example, during certain autonomous vehicle operations, images captured by a camera are passed to the virtual driver system. Based on the image, the virtual driver system generates control signals to components of the automated vehicle platform, which carry out the autonomous vehicle operations. Issues can arise, however, if the images captured by the camera are not authentic. An example of inauthentic images (also referred to as "false images") may include images presented to the virtual driver system via an injection attack. An injection attack occurs when false images (i.e., images containing objects different from the objects detected by the camera) are maliciously uploaded to the autonomous vehicle.

Watermarking is one way to limit the likelihood that the autonomous vehicle will act upon false images. Watermarking can involve including copyright material, ownership protection, tamper detection, and so on. Even still, some watermarking techniques, such as watermarking techniques that embed the same watermark into every watermarked copy of the data segment, are vulnerable to watermark estimation attacks and injection attacks. Specifically, the attacker has the knowledge of the watermark embedding algorithm and can estimate the embedded watermark using a sample of watermarked data. The attacker can embed the watermark onto fake data (i.e., false images) and inject the false images into the communication channel between the sensor and the receiving module. Because the false images include the expected watermark, the receiving module may incorrectly recognize the false image as an accurate image, resulting in the receiving module relying on compromised data.

One way to reduce the likelihood that an autonomous vehicle will operate according to false images is with an image watermarking system implemented by one or more vehicle computers, a vehicle system, or a combination of both.

One vehicle computer includes a watermark memory and a watermark processor programmed to execute instructions stored in the watermark memory. The instructions include receiving an image captured by a camera, selecting a set of random pixel locations, generating a random watermark, and inserting the random watermark into the image at the selected random pixel locations.

In that implementation, the watermark processor may be programmed to receive a secret key during a cryptographic handshake procedure with a validation processor incorporated into a vehicle controller. The secret key may include a random index selection key and a watermark generation key. In that instance, the watermark processor may be programmed to select a set of random pixel locations in accordance with the random index selection key. Alternatively or in addition, the watermark processor may be programmed to generate the watermark with a set of random watermark values in accordance with the watermark generation key.

Another vehicle computer includes a validation memory and a validation processor programmed to execute instructions stored in the validation memory. The instructions include receiving a watermarked image, determining a random watermark, detecting an embedded watermark from the received watermarked image by selecting a set of random pixels in the watermarked image and analyzing the selected set of random pixels in the watermarked image for the random watermark, and authenticating the watermarked image as a result of determining that the watermarked image includes the random watermark at the random pixel locations.

In that implementation, the validation processor may be programmed to receive a secret key during a cryptographic handshake procedure with a watermark processor. The secret key may include a random index selection key and a watermark generation key. The validation processor may be programmed to determine the random pixel locations in accordance with the random index selection key. The validation processor may also be programmed to determine the random watermark value in accordance with the watermark generation key. Alternatively or in addition, the validation processor may be programmed to detect that the watermarked image includes the random watermark at the random pixel locations by performing an image processing technique on the watermarked image.

A vehicle system for implementing the image processing system includes a camera programmed to capture an original image and a watermark processor and a validation processor. The watermark processor is programmed to receive the original image captured by the camera, select a set of random pixel locations, generate a random watermark, and embed the random watermark into the original image at the set of random pixel locations to generate a watermarked image. The validation processor is programmed to receive the watermarked image, determine the random watermark, detect the embedded watermark in the received watermarked image by selecting the set of random pixels and analyzing the selected set of random pixels for the random watermark, and authenticate the watermarked image as a result of determining that the watermarked image includes the random watermark embedded at the random pixel locations.

The validation processor and the watermark processor may be programmed to exchange, with one another, a secret key during a cryptographic handshake procedure. The secret key may include a random index selection key and a watermark generation key. In that approach, the validation processor and the watermark processor may be programmed to independently determine the random pixel locations in accordance with the random index selection key. The validation processor and the watermark processor may be programmed to independently determine the random watermark in accordance with the watermark generation key.

In the vehicle system, the validation processor may be programmed to detect that the watermarked image includes the random watermark at the random pixel locations by performing an image processing technique on the watermarked image.

In the vehicle system, the watermark processor may be incorporated into the camera.

In the vehicle system, the validation processor may be incorporated into an automated vehicle platform controller.

In the vehicle system, the watermark processor may be incorporated into a virtual driver system.

In the vehicle system, the camera may be programmed to capture the original image at a pixel resolution and the watermark processor may be programmed to generate the watermark based at least in part on the pixel resolution.

The watermarking implementation performed by the image watermarking system described herein can generate a new watermark $W_i$ using a secret seeded key that is shared during a cryptographic handshake at vehicle startup or during pre-trip operations. With the secret key, the watermarking system injects a randomly generated rotating value into a randomly chosen pixel locations for each embedding instance. The secret key may include or define a random index selection key (discussed below), a watermark generation key (discussed below), and a spreading factor (discussed below). In addition, for each embedding instance, a set of randomly selected data indices may also be used to select sensor data samples for watermark embedding. Therefore, each watermarked data segment will carry a different watermark embedded at randomly selected different locations. This implementation is robust to the watermark estimation attack discussed above because, for each watermark data segment, a different watermark is embedded at a different location.

The elements shown may take many different forms and include multiple and/or alternate components and facilities. The example components illustrated are not intended to be limiting. Indeed, additional or alternative components and/or implementations may be used. Further, the elements shown are not necessarily drawn to scale unless explicitly stated as such.

Figure 1:
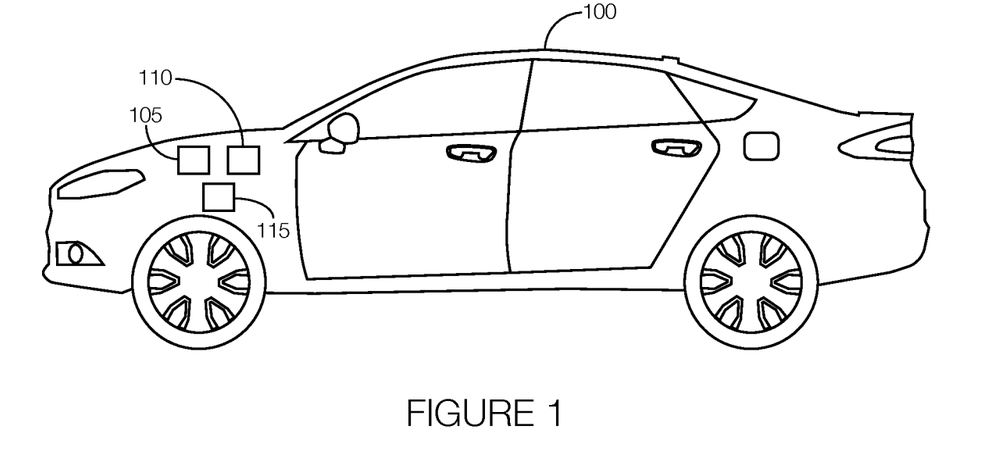
FIG. 1 illustrates an example autonomous vehicle with a virtual driver system, an automated vehicle platform, and an image watermarking system.
Figure 2:
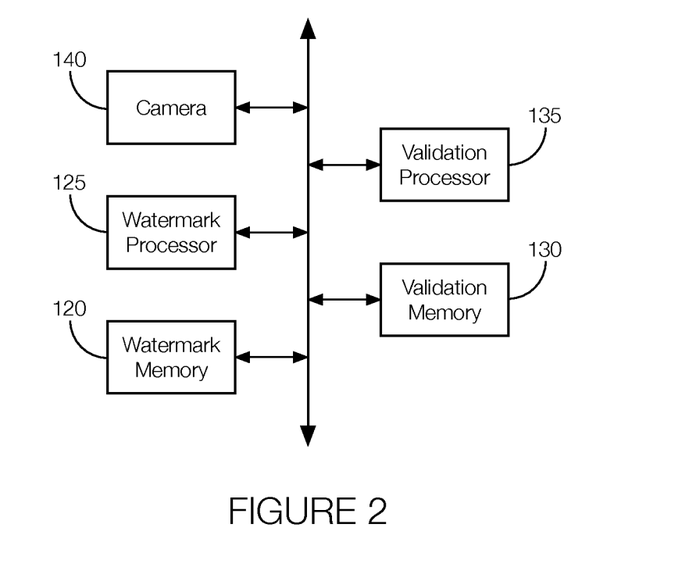
FIG. 2 is a block diagram showing example components of the image watermarking system, including a watermark processor and a validation processor.

As illustrated in FIGS. 1 and 2, the autonomous host vehicle 100 includes a virtual driver system 105, an automated vehicle platform 110, and an image watermarking system 115 implemented via one or more vehicle computers collectively having a watermark memory 120, a watermark processor 125, a validation memory 130, and a validation processor 135. Although illustrated as a sedan, the host vehicle 100 may include any passenger or commercial automobile such as a car, a truck, a sport utility vehicle, a crossover vehicle, a van, a minivan, a taxi, a bus, etc. Further, the host vehicle 100 is an autonomous vehicle that can operate in an autonomous (e.g., driverless) mode, a partially autonomous mode, and/or a non-autonomous mode. The partially autonomous mode may refer to the SAE Level 2 mode of operation where the host vehicle 100 can control steering, acceleration, and braking under certain circumstances without human interaction. The partially autonomous mode may further refer to the SAE Level 3 mode of operation where the host vehicle 100 can handle steering, acceleration, and braking under certain circumstances, as well as monitoring of the driving environment, even though some human interaction is sometimes needed.

The virtual driver system 105 is a computing platform, implemented via sensors, controllers, circuits, chips, and other electronic components, that control various autonomous operations of the host vehicle 100. The virtual driver system 105 includes an autonomous vehicle controller programmed to process the data captured by the sensors, which may include a camera 140, a lidar sensor, a radar sensor, ultrasonic sensors, etc. The autonomous vehicle controller is programmed to output control signals to components of the automated vehicle platform 110 to autonomously control the host vehicle 100 according to the data captured by the sensors.

The camera 140 is a vision sensor. The camera 140 may capture images of an area around the host vehicle 100, including an area ahead of the host vehicle 100, behind the host vehicle 100, or next to the host vehicle 100. To capture such images, the camera 140 may include a lens that projects light toward, e.g., a CCD image sensor, a CMOS image sensor, etc. The camera 140 processes the light and generates the image. The image may be output to the watermark processor 125 and, as discussed in greater detail below, can be used by the autonomous driver system to carry out autonomous vehicle operations of the host vehicle 100. The watermark processor 125 may apply the watermark at a set of random pixel locations and with a random value prior to outputting the watermark processor 125 to the virtual driver system 105. Further, although discussed in the context of images captured by the camera 140, the watermarking system may similarly apply watermarks to the outputs of the other sensors of the virtual driver system 105.

The automated vehicle platform 110 refers to the components that carry out the autonomous vehicle operation upon instruction from the virtual driver system 105, and specifically, from an autonomous vehicle controller incorporated into the virtual driver system 105. As such, the automated vehicle platform 110 includes various actuators located throughout the host vehicle 100 that control the steering, propulsion, and braking of the host vehicle 100. The automated vehicle platform 110 further includes various platform controllers (sometimes referred to in the art as "modules"), such as a chassis controller, a powertrain controller, a body controller, an electrical controller, etc. Each actuator is controlled by control signals output by the virtual driver system 105. Electrical control signals output by the virtual driver system 105 may be converted into mechanical motion by the actuator. Examples of actuators may include a linear actuator, a servo motor, or the like.

The watermarking system, as explained above, may be implemented by a vehicle computer that includes a watermark memory 120, a watermark processor 125, a validation memory 130, and a validation processor 135. When applied to an image, a watermark may have two or more characteristics including a watermark value (which could be a color) and a set of pixel locations. As discussed in greater detail below, both the watermark and the pixel locations may be randomized, and the watermark processor 125 and the validation processor 135 may independently determine both the watermark value and pixel locations based on a secret key shared during a cryptographic handshake.

The watermark memory 120 is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The watermark memory 120 may store instructions executable by the watermark processor 125 and data such as images captured by the camera 140, the secret key used to generate the watermark, etc. The instructions and data stored in the watermark memory 120 may be accessible to the watermark processor 125, and at least some of the data may be made available to other components of the image watermarking system 115, the host vehicle 100, or both.

The watermark processor 125 is implemented via circuits, chips, or other electronic component and may include one or more microcontrollers, one or more field programmable gate arrays (FPGAs), one or more application specific integrated circuits (ASICs), one or more digital signal processors (DSPs), one or more customer specific integrated circuits, etc. The watermark processor 125 is programmed to process the camera 140 images to insert a watermark into the images captured by the camera 140 and output a watermarked image (i.e., an image containing the watermark). The watermark processor 125 may be programmed to select a random pixel locations and embed the watermark, including watermark, into the image at the random pixel locations. The watermark and the random pixel locations may be functions of a secret key shared between the watermark processor 125 and the validation processor 135 at, e.g., vehicle startup or some other time. In some instances, the secret key can be shared at vehicle startup and then changed at various intervals, including random intervals, during operation of the host vehicle 100. Operations of the watermark processor 125 are discussed in greater detail below with respect to FIG. 3. Further, the watermark processor 125 may be incorporated into another component of the host vehicle 100. For example, the watermark processor 125 may be incorporated into the camera 140, the virtual driver system 105, etc.

The validation memory 130 is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The validation memory 130 may store instructions executable by the validation processor 135 and data such as watermarked images, the secret key used to generate the watermark, etc. The instructions and data stored in the validation memory 130 may be accessible to the validation processor 135, and at least some of the data may be made available to other components of the image watermarking system 115, the host vehicle 100, or both.

The validation processor 135 is implemented via circuits, chips, or other electronic component and may include one or more microcontrollers, one or more field programmable gate arrays (FPGAs), one or more application specific integrated circuits (ASICs), one or more digital signal processors (DSPs), one or more customer specific integrated circuits, etc. The validation processor 135 is programmed to receive watermarked images (i.e., images containing the watermark added by the watermark processor 125), extract the watermark (e.g., identify the random pixel locations and watermark based on the secret key shared with the watermark processor 125 during the handshake procedure), and authenticate the images based on the presence of the expected watermark at the expected pixel locations based on the secret key. Upon authenticating the validity of the images, the validation processor 135 may be programmed to output a signal to the virtual driver system 105 approving the image. In response, the virtual driver system 105 may output signals to the automated vehicle platform 110 to initiate various autonomous vehicle operations based on the images captured by the camera 140. If the validation processor 135 determines that the watermark does not appear at the expected pixel locations or that the watermark does not have the expected watermark, the validation processor 135 may be programmed to output a signal to the virtual driver system 105, to a module in the automated vehicle platform 110, or both, identifying the image as a false image. As a result, the virtual driver system 105, the automated vehicle platform 110, or both, may ignore the false image, set a flag indicating a possible injection attack, initiate a minimal risk condition (MRC) event, or take another remedial action to minimize the effect of the false image. Operations of the validation processor 135 are discussed in greater detail below with respect to FIG. 4. Further, the validation processor 135 may be incorporated into another component of the host vehicle 100, and the host vehicle 100 may include any number of validation processors 135. For example, the validation processor 135 may be incorporated into the virtual driver system 105, the autonomous vehicle controller, etc. Alternatively or in addition, a different validation processor 135 may be incorporated into each of the controllers of the automated vehicle platform 110.

Figures 3, 4:
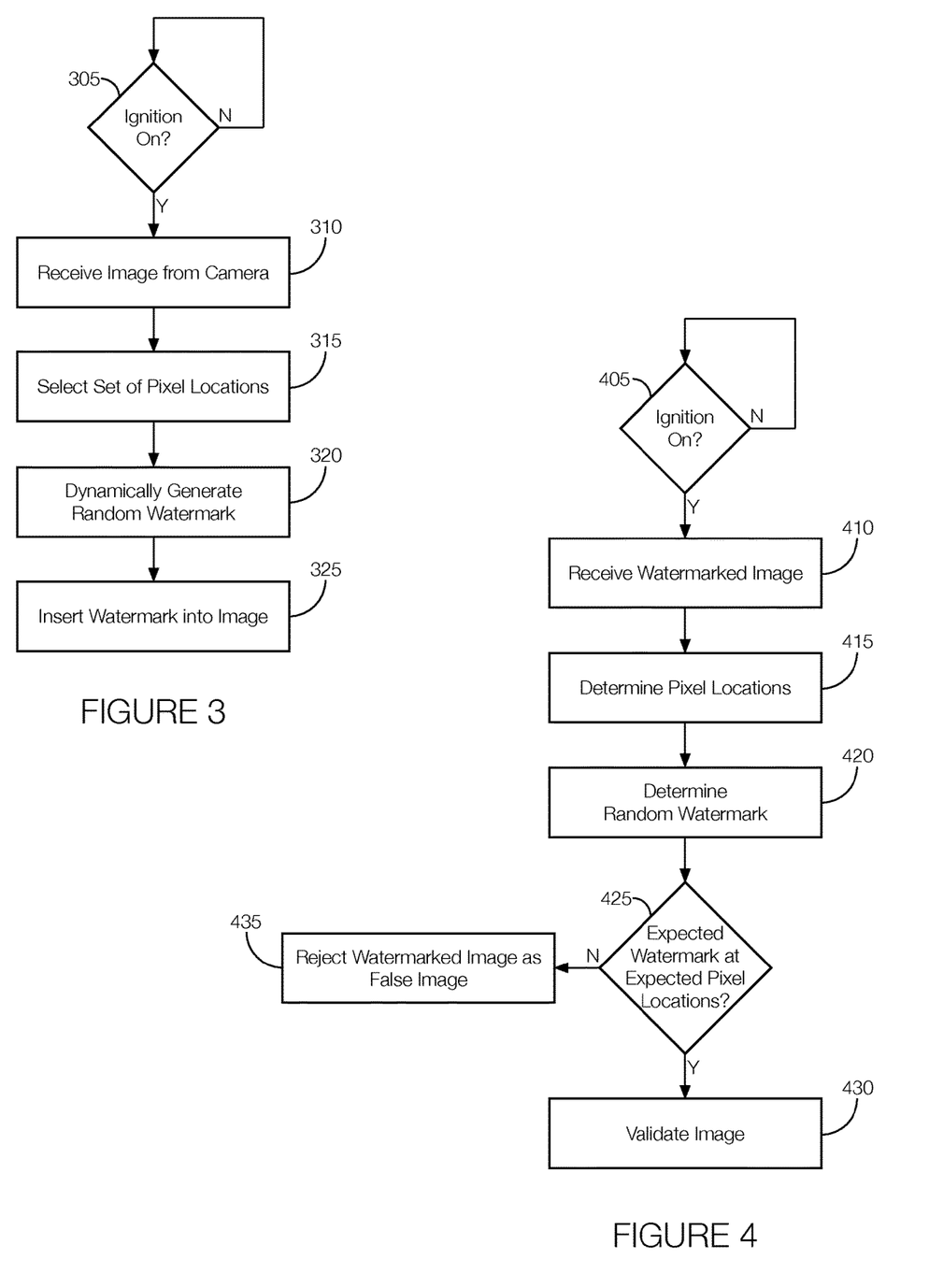
FIG. 3 is a flowchart of an example process that may be executed by the watermark processor.
FIG. 4 is a flowchart of an example process that may be executed by the validation processor.

FIG. 3 is a flowchart of an example process 300 that may be executed by the watermark processor 125. The process 300 may begin at any time the host vehicle 100 is operating and collecting data via the sensors that needs to be validated before the host vehicle 100 can act on it. For example, the process 300 may run any time the camera 140 is capturing images. Moreover, the process 300 may begin any time after the cryptographic handshake takes place between the watermark processor 125 and the validation processor 135.

At decision block 305, the watermark processor 125 determines if the host vehicle 100 is in an "ignition on" state. If so, the process 300 may proceed to block 310. Otherwise, the process 300 may end or wait for the host vehicle 100 to be in "ignition on" state. That way, the rest of the process 300 need not run when the host vehicle 100 does not need to rely on images captured by the camera 140.

At block 310, the watermark processor 125 receives the image captured by the camera 140. The image may be received, from the camera 140, as part of a video stream. Put another way, the image may be a "frame" in a video stream. Also, the pre-watermarked version of the image may be referred to as the "original image." Thus, the original image may be received at block 310.

At block 315, the watermark processor 125 selects a set of pixel locations for watermark insertion. The pixel locations may be randomly selected from the random index selection key and the pixel resolution of the camera 140. The random index selection key, the pixel resolution of the camera 140, or both, may be shared during the cryptographic handshake procedure between the watermark processor 125 and the validation processor 135. The watermark processor 125 may include a random number generator that generates a random number based on the random index selection key and the pixel resolution of the camera 140. If the random number generated by the random number generated has been used before by the watermark processor 125, the watermark processor 125 may have the random number generator generate a new random number until one is generated that has not been used previously. Block 315 may further include generating the pixel locations based on the pixel selection key. That is, secret key is used to select N×M indices, which defines the random pixel locations. The output of block 315 may be the N×M length index.

At block 320, the watermark processor 125 dynamically generates a random watermark. The watermark may be a function of the watermark generation key and a spreading factor. The watermark generation key, the spreading factor, or both, may be shared between the watermark processor 125 and the validation processor 135 during the cryptographic handshake procedure. The watermark processor 125 may incorporate a random number generator to generate a random number according to the watermark generation key and the spreading factor. The watermark processor 125 may apply scaling to the random number output by the random number generator. The scaling may be a function of the GPS location of the host vehicle 100 and the present time. That is, the watermark processor 125 may be programmed to receive the GPS location of the host vehicle 100 from, e.g., a GPS sensor, process the GPS location and present time (performing quantization and encoding, performing binary conversion, performing binary to polar mapping, etc.), and scale the random number output by the random number generator according to the output of the binary to polar mapping. The scaled random number may be further processed by the watermark processor 125. For example, the watermark processor 125 may generate an N×M length watermark from the scaled random number. The output of block 320 may be the N×M length watermark.

At block 325, the watermark, defined by the N×M length watermark from block 320, may be inserted into the image at the pixel locations, defined by the N×M length index from block 315. The output of block 325 may be the watermarked image. The watermarked image may be transmitted to the virtual driver system 105, one of the controllers in the automated vehicle platform 110, or both, via a communication channel such as a communication bus.

The process 300 may return to block 305 so that additional images may be processed. Further, each iteration of the process 300 results in a different pixel locations (a different N×M length index) and a different watermark (a different N×M length watermark value). Thus, during each key cycle, and possibly during the life of the host vehicle 100, no two images processed by the virtual driver system 105 and automated vehicle platform 110 will have the same watermark at the same pixel locations, which makes the secret key difficult to reproduce and the locations and values of future watermarks and embedding locations difficult to predict.

FIG. 4 is a flowchart of an example process 400 that may be executed by the validation processor 135. The process 400 may begin at any time the host vehicle 100 is operating and collecting data via the sensors that needs to be validated before the host vehicle 100 can act on it. For example, the process 400 may run any time the camera 140 is capturing images. Moreover, the process 400 may be executed any time after the cryptographic handshake takes place between the watermark processor 125 and the validation processor 135.

At decision block 405, the validation processor 135 determines if the host vehicle 100 is in an "ignition on" state. If so, the process 400 may proceed to block 410. Otherwise, the process 400 may end or wait for the host vehicle 100 to be in "ignition on" state. That way, the rest of the process 400 need not run when the host vehicle 100 does not need to rely on images captured by the camera 140.

At block 410, the validation processor 135 receives the watermarked images output by the watermark processor 125. The image may be received as part of a video stream. Put another way, the image may be a "frame" in a video stream. The watermarked images may be received via a communication channel, such as a communication bus.

At block 415, the validation processor 135 independently determines the pixel locations. In this instance, "independently" means "separately from the watermark processor 125." In other words, the validation processor 135 does not rely on the watermark processor 125 to determine the pixel locations. The validation processor 135 may determine the pixel locations from a random index selection key and the pixel resolution of the camera 140. The random index selection key, the pixel resolution of the camera 140, or both, may be shared during the cryptographic handshake procedure between the watermark processor 125 and the validation processor 135. That way, both the watermark processor 125 and the validation processor 135 may be able to generate the same random number at blocks 315 and 415 of their respective processes 300, 400. Like the watermark processor 125, the validation processor 135 may include a random number generator that generates a random number based on the random index selection key and the pixel resolution of the camera 140. The random number output by the random number generator is the same as that output by the watermark processor 125 at block 315 since both the watermark processor 125 and the validation processor 135 are working from the same secret key. If the random number generated by the random number generated has been used before, at least during the same key cycle, the validation processor 135 may have the random number generator generate a new random number until one is generated that has not been used previously. Block 415 may further include generating the pixel locations based on the embedding location selection key. That is, the random number may be converted to an N×M length index, which defines the random pixel locations. The output of block 415 may be the same as the N×M length index generated at block 315.

At block 420, the validation processor 135 independently generates a watermark. In this instance, as in the previous instance, "independently" means "separately from the watermark processor 125." In other words, the validation processor 135 does not rely on the watermark processor 125 to determine the watermark. The watermark may be a function of the watermark generation key and a spreading factor. The watermark generation key and the spreading factor may be shared between the watermark processor 125 and the validation processor 135 during the cryptographic handshake procedure. The validation processor 135 may incorporate a random number generator to generate a random number according to the watermark generation key and the spreading factor, which are the same as those used by the watermark processor 125. The watermark processor 125 may apply scaling to the random number output by the random number generator. The scaling may be a function of the GPS location of the host vehicle 100 and the present time. That is, the validation processor 135 may be programmed to receive the GPS location of the host vehicle 100 from, e.g., a GPS sensor, process the GPS location and present time (performing quantization and encoding, performing binary conversion, performing binary to polar mapping, etc.), and scale the random number output by the random number generator according to the output of the binary to polar mapping. The scaled random number may be further processed by the validation processor 135. For example, the validation processor 135 may generate an N×M length watermark from the scaled random number. The output of block 420 may be the same N×M length watermark as generated at block 320.

At decision block 425, the validation processor 135 determines if the expected watermark is at the expected pixel locations in the image received at block 410. That is, the validation processor 135 performs an image processing technique on the image received at block 410 to determine if the image contains the watermark having the watermark determined at block 420 at the pixel locations determined at block 415. If both of those conditions are satisfied, the process 400 proceeds to block 430. Otherwise, the process 400 proceeds to block 435.

At block 430, the validation processor 135 validates the image received at block 410. The validation processor 135 may conclude that the image received at block 410 is authentic because it contains the expected watermark and pixel locations generated from the shared key. In other words, the validation processor 135 may be programmed to recognize that the source of the image, which contains the watermark at the pixel locations, most likely came from the camera 140 and is therefore not a false image, since it is highly improbable that a false image provided to the host vehicle 100, and in particular to the validation processor 135, during an injection attack would have the correct watermark (e.g., the correct watermark at the correct pixel locations) without knowing the secret key. The output of block 430 may include a signal to components of the virtual driver system 105, the automated vehicle platform 110, or both, authenticating the image and thereby authorizing the virtual driver system 105 and/or automated vehicle platform 110 to autonomously operate the host vehicle 100 in accordance with the authenticated image.

At block 435, the validation processor 135 rejects the image received at block 410. The process 400 arrives at block 435 as a result of an unexpected watermark in the image. An unexpected watermark may include a missing watermark, a watermark with the wrong watermark value (regardless of whether the pixel locations are correct), a watermark at the wrong pixel locations (regardless of whether the embedded watermark is correct), etc. The output of block 435 may include outputting a signal to delete the image received at block 410 from the memory, outputting a signal instructing the virtual driver system 105 and/or automated vehicle platform 110 to ignore the image received at block 410, outputting a signal instructing the virtual driver system 105 to execute an MRC event, or the like.

The process 400 may return to block 405 so that additional images may be processed and either validated or rejected.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A vehicle computer comprising:
a watermark memory; and
a watermark processor programmed to execute instructions stored in the watermark memory, the instructions including instructions to:
receive a plurality of images captured by a camera, and for each image:
select a set of random pixel locations,
input a current location of a vehicle and a watermark generation key into a watermark generation program to generate a random watermark, and
embed the random watermark into the image at the set of random pixel locations;
wherein the watermark generation program includes inputting the watermark generation key into a random number generator to generate a random number and scaling the random number based on the location of the vehicle.

2. The vehicle computer of claim 1, wherein the watermark processor is programmed to receive a secret key during a cryptographic handshake procedure with a validation processor incorporated into a vehicle controller, wherein the secret key includes a random index selection key and a watermark generation key.

3. The vehicle computer of claim 2, wherein the watermark processor is programmed to input the random index selection key to a random number generator to select the random pixel locations.

4. The vehicle computer of claim 2, wherein the watermark processor is programmed to generate the watermark with a set of random watermark values in accordance with the watermark generation key.

5. A vehicle computer comprising:
a validation memory; and
a validation processor programmed to execute instructions stored in the validation memory, the instructions including instructions to:
receive a plurality of watermarked images, and for each watermarked image:
input a current location of a vehicle and a watermark generation key into a watermark generation program to determine a random watermark,
detect an embedded watermark from the received watermarked image by selecting a set of random pixels in the watermarked image and analyzing the selected set of random pixels in the watermarked image for the random watermark, and
authenticate the watermarked image as a result of determining that the watermarked image includes the random watermark at the set of random pixel locations;
wherein the watermark generation program includes inputting the watermark generation key into a random number generator to generate a random number and scaling the random number based on the location of the vehicle.

6. The vehicle computer of claim 5, wherein the validation processor is programmed to receive a secret key during a cryptographic handshake procedure with a watermark processor, wherein the secret key includes a random index selection key and a watermark generation key.

7. The vehicle computer of claim 6, wherein the validation processor is programmed to input the random index selection key to a random number generator to determine the set of random pixel locations.

8. The vehicle computer of claim 6, wherein the validation processor is programmed to determine the random watermark in accordance with the watermark generation key.

9. The vehicle computer of claim 5, wherein the validation processor is programmed to detect that the watermarked image includes the random watermark at the set of random pixel locations by performing an image processing technique on the watermarked image.

10. A vehicle system comprising:
a camera programmed to capture an original image;
a watermark processor programmed to:
  receive the original image captured by the camera,
  select a set of random pixel locations,
  input a current location of a vehicle and a watermark generation key into a watermark generation program to generate a random watermark, and
  embed the random watermark into the original image at the set of random pixel locations to generate a watermarked image; and
a validation processor programmed to:
  receive the watermarked image,
  input the current location of the vehicle and the watermark generation key into the watermark generation program to determine the random watermark,
  detect the random watermark in the received watermarked image by selecting the set of random pixels and analyzing the selected set of random pixels for the random watermark, and
  authenticate the watermarked image as a result of determining that the watermarked image includes the random watermark embedded at the random pixel locations;
wherein the watermark generation program includes inputting the watermark generation key into a random number generator to generate a random number and scaling the random number based on the location of the vehicle.

11. The vehicle system of claim 10, wherein the validation processor and the watermark processor are programmed to exchange, with one another, a secret key during a cryptographic handshake procedure, wherein the secret key includes a random index selection key and a watermark generation key.

12. The vehicle system of claim 11, wherein the validation processor and the watermark processor are programmed to independently determine the random pixel locations in accordance with the random index selection key.

13. The vehicle system of claim 11, wherein the validation processor and the watermark processor are programmed to independently determine the random watermark in accordance with the watermark generation key.

14. The vehicle system of claim 10, wherein the validation processor is programmed to detect that the watermarked image includes the random watermark at the random pixel locations by performing an image processing technique on the watermarked image.

15. The vehicle system of claim 10, wherein the watermark processor is incorporated into the camera.

16. The vehicle system of claim 10, wherein the validation processor is incorporated into an automated vehicle platform controller.

17. The vehicle system of claim 10, wherein the watermark processor is incorporated into a virtual driver system.

18. The vehicle system of claim 10, wherein the camera is programmed to capture the original image at a pixel resolution and wherein the watermark processor is programmed to generate the watermark based at least in part on the pixel resolution.

* * * * *